US010015647B1

(12) United States Patent
Garre

(10) Patent No.: US 10,015,647 B1
(45) Date of Patent: Jul. 3, 2018

(54) MEASURING SUBSCRIBER COUNT, MESSAGE COUNT AND MESSAGE TYPE BETWEEN A WIRELESS COMMUNICATION NETWORK AND A WIRELESS LOCAL ACCESS NETWORK (WLAN)

(71) Applicant: T-Mobile USA, Inc., Bellevue, WA (US)

(72) Inventor: Rajesh Garre, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/395,272

(22) Filed: Dec. 30, 2016

(51) Int. Cl.
*H04W 4/12* (2009.01)
*H04W 8/18* (2009.01)
*H04W 84/12* (2009.01)
*H04W 88/16* (2009.01)

(52) U.S. Cl.
CPC .............. *H04W 4/12* (2013.01); *H04W 8/18* (2013.01); *H04W 84/12* (2013.01); *H04W 88/16* (2013.01)

(58) Field of Classification Search
CPC ......... H04W 4/12; H04W 8/18; H04W 8/183; H04W 8/186
See application file for complete search history.

(56) References Cited

U.S. PATENT DOCUMENTS

2005/0003838 A1\* 1/2005 McCann ................. H04W 4/14
455/466

\* cited by examiner

*Primary Examiner* — Magdi Elhag
(74) *Attorney, Agent, or Firm* — Lee & Hayes, PLLC

(57) ABSTRACT

A method of determining a number of subscribers to a wireless communication network that access the wireless communication network via a wireless local access network (WLAN). For example, a session border gateway (SBG) or session border controller (SBC) located within the wireless communication network applies header manipulation rules (HMR) to messages sent and received within the wireless communication network in order to determine where the messages are being sent from and where the messages are being sent to. Based upon the information, it can be determined who the subscribers are that are sending the messages and receiving the messages and if they are connected to the wireless communication network via a WLAN. In embodiments, it can also be determined what type of messages are being sent and received based upon information in the headers obtained by the SBG or SBC.

20 Claims, 4 Drawing Sheets

MEASURING SUBSCRIBER COUNT, MESSAGE COUNT AND MESSAGE TYPE BETWEEN A WIRELESS COMMUNICATION NETWORK AND A WIRELESS LOCAL ACCESS NETWORK (WLAN)

BACKGROUND

In recent years, telecommunication devices have advanced from offering simple voice calling services within wireless networks to providing users with many new features. Telecommunication devices now provide messaging services such as email, text messaging, and instant messaging; data services such as Internet browsing; media services such as storing and playing a library of favorite songs; location services; and many others. In addition to the new features provided by the telecommunication devices, users of such telecommunication devices have greatly increased. Such an increase in users is only expected to continue and in fact, it is expected that there could be a growth rate of twenty times more users in the next few years alone. Such an increase in wireless traffic implies more demand and less radio resource availability, which likely leads to the degradation of the wireless network performance.

Currently, mobile devices on airplanes are only allowed to be powered on once the airplane is 10,000 feet or higher, although the altitude may change in future years. Additionally, once the mobile device is allowed to be powered on, the mobile device generally needs to be activated in only what is referred to as an "airplane mode." Airplane mode generally does not allow for activation of a cellular radio, e.g., a radio that allows for direct connection to a wireless communication network for the purpose of making phone calls, access to the Internet, etc.

However, airplane mode does generally allow for connection to a wireless local access network (WLAN) on an airplane via WiFi for connection to a wireless communication network. Such a connection via WiFi generally allows for access to the Internet and other features provided by the WLAN on the airplane. Thus, in airplane mode, in order to connect to the WLAN via WiFi, the mobile device needs to activate a non-cellular radio that does not allow for direct connection to a wireless communication network for the purpose of making phone calls. Once the mobile device is connected to the WLAN, the mobile device may connect to a wireless communication network for various messaging purposes. Currently, there is no way to know which mobile devices are connected to the wireless communication network via the WLAN of an airplane and obtain a message count of messages sent and received by the mobile device via the WLAN, as well as what type of messages are sent and received.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein is a wireless communication network that includes techniques and architecture for determining a number of subscribers to a wireless communication network that access the wireless communication network via a wireless local access network (WLAN). For example, a session border controller (SBC) or session border gateway (SBG) located within the wireless communication network applies header manipulation rules (HMR) to messages sent and received within the wireless communication network in order to determine where the messages are being sent from and where the messages are being sent to. Based upon the information, it can be determined who the subscribers are that are sending the messages and receiving the messages and if they are connected to the wireless communication network via a WLAN. In embodiments, it can also be determined what type of messages are being sent and received, e.g., short message service (SMS) messages, multimedia messaging service (MMS) messages, visual voice mail (VVM) messages, rich communication services (RCS) messages, etc., based upon information in the headers obtained by the SBC or SBG. In embodiments, the WLAN is located on an airplane.

In embodiments, the SBC or SBG applies HMRs to messages transmitted within the wireless communication network. The HMRs may allow the SBC or SBG to determine which messages originated from or are being sent to a WLAN. Upon determining which messages originated from or are being sent to the WLAN, the SBC or SBG may determine a number of subscribers are accessing the wireless communication network via the WLAN to provide a unique subscriber count for subscribers using the WLAN.

In embodiments, the HMRs may also allow the SBC or SBG to determine which messages of the WLAN are RCS messages and thus, provide a unique count of RCS sessions and messages for the WLAN. The HMRs may also allow the SBC or SBG to determine which messages of the WLAN are SMS messages, MIMS messages and VVM messages and thus, are session initiation protocol (SIP) messages over Internet Protocol (IP) networks.

Figure 1:
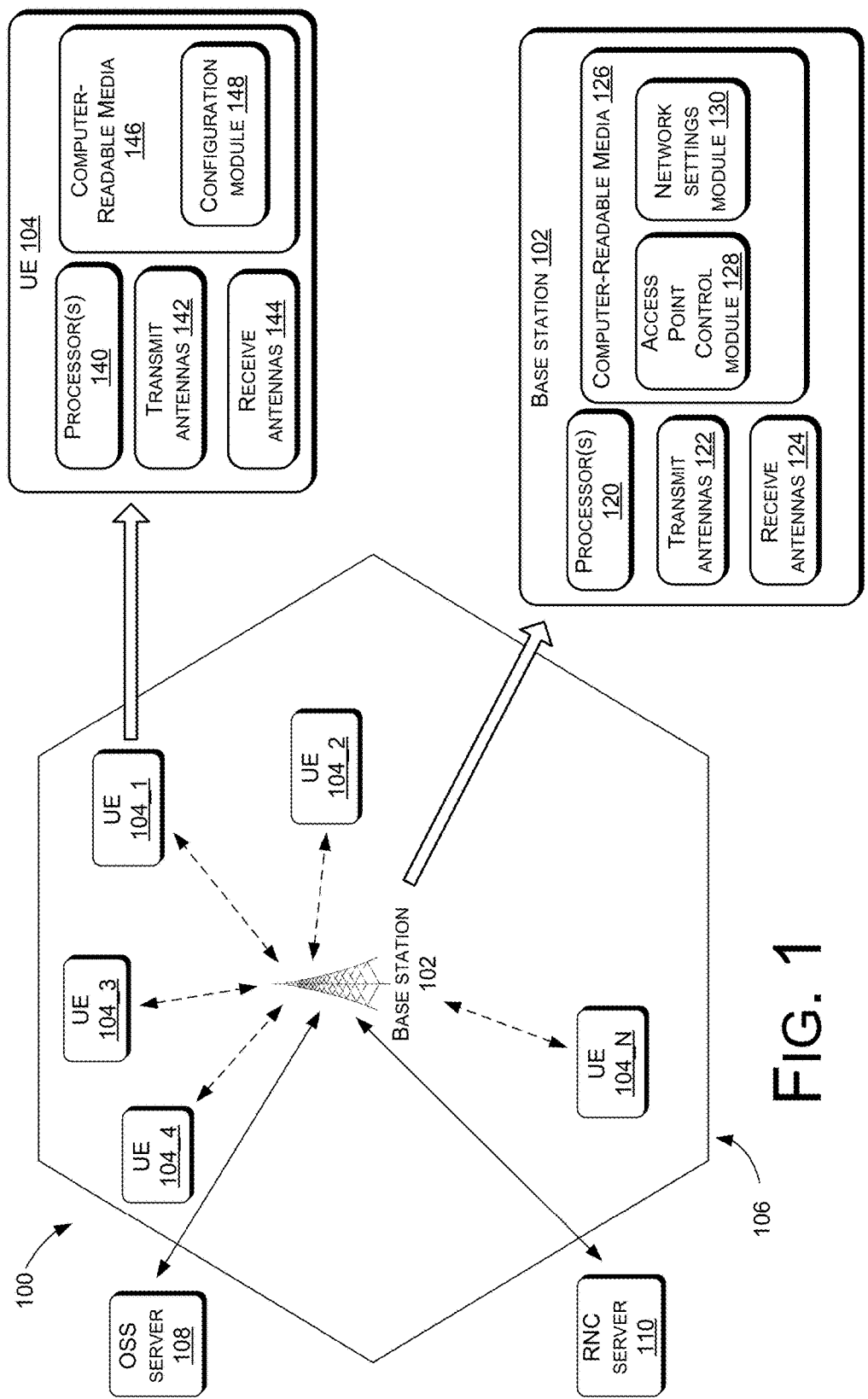
FIG. 1 illustrates a wireless communication network, in accordance with various embodiments.

FIG. 1 illustrates a wireless communication network 100 (also referred to herein as network 100). The network 100 comprises a base station (BS) 102 communicatively coupled to a plurality of user devices, referred to as UEs 104_1, 104_2, . . . , 104_N, where N is an appropriate integer. The BS 102 serves UEs 104 located within a geographical area, e.g., within a macro cell 106. FIG. 1 illustrates the macro cell 106 to be hexagonal in shape, although other shapes of the macro cell 106 may also be possible. In general, the network 100 comprises a plurality of macro cells 106, with each macro cell 106 including one or more BSs 102.

In an embodiment, the UEs 104_1, . . . , 104_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, and/or the like. As such, UEs 104_1, . . . , 104_N may range widely in terms of capabilities and features. For example, one of the UEs 104_1, . . . , 104_N may have a numeric keypad, a capability to display only a few lines of text and be configured to interoperate with only Global System for Mobile Communications (GSM) networks. However, another of the UEs 104_1, . . . , 104_N (e.g., a smart phone) may have a touch-sensitive screen, a stylus, an embedded GPS receiver, and a relatively high-resolution display, and be configured to interoperate with multiple types of networks. UEs 104_1, . . . , 104_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 102 may communicate voice traffic and/or data traffic with one or more of the UEs 104_1, . . . , 104_N. The BS 102 may communicate with the UEs 104_1, . . . , 104_N using one or more appropriate wireless communication protocols or standards. For example, the BS 102 may communicate with the UEs 104_1, . . . , 104_N using one or more standards, including but not limited to GSM, Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 102 may be communicatively coupled (e.g., using a backhaul connection, illustrated using solid lines in FIG. 1) to a number of backhaul equipments, e.g., an operation support subsystem (OSS) server 108, a radio network controller (RNC) 110, and/or the like. The RNC 110 can also be in the form of a mobility management entity when the wireless communication network 100 operates according to the long term evolution (LTE) standard or LTE Advanced standard.

In an embodiment, the base station 102 may comprise processors 120, one or more transmit antennas (transmitters) 122, one or more receive antennas (receivers) 124, and computer-readable media 126. The processors 120 may be configured to execute instructions, which may be stored in the computer-readable media 126 or in other computer-readable media accessible to the processors 120. In some embodiments, the processors 120 are a central processing unit (CPU), a graphics processing unit (GPU), or both CPU and GPU, or any other sort of processing unit. The base station 102 can also be in the form of a Node B (where the wireless communication network 100 is 3G UMTS network) or in the form of an eNode B (where the wireless communication network 100 operates according to the LTE standard or LTE Advanced standard).

The one or more transmit antennas 122 may transmit signals to the UEs 104_1, . . . , 104_N, and the one or more receive antennas 124 may receive signals from the UEs 104_1, . . . , 104_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a transceiver module of the BS 102.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 102. The computer-readable media 126 may reside within the base station 102, on one or more storage devices accessible on a local network to the base station 102, on cloud storage accessible via a wide area network to the base station 102, or in any other accessible location.

The computer-readable media 126 may store modules, such as instructions, data stores, and so forth that are configured to execute on the processors 120. For instance, the computer-readable media 126 may store an access point control module 128 and a network settings module 130, as will be discussed in more detail herein later.

Although FIG. 1 illustrates the computer-readable media 126 in the BS 102 storing the access point control module 128 and the network settings module 130, in various other embodiments, the access point control module 128, the network settings module 130, and one or more other modules (not illustrated, may be stored in another component of the network 100 (e.g., other than the BS 102). For example, one or more of these modules may be stored in a computer-readable media included in the OSS server 108, the RNC 110, another appropriate server associated with the network 100, and/or the like.

Although not illustrated in FIG. 1, various other modules (e.g., an operating system module, basic input/output systems (BIOS), etc.) may also be stored in the computer-readable media 126. Furthermore, although not illustrated in FIG. 1, the base station 102 may comprise several other components, e.g., a power bus configured to supply power to various components of the base station 102, one or more interfaces to communicate with various backhaul equipment, and/or the like.

In an embodiment, the UEs 104 may comprise processors 140, one or more transmit antennas (transmitters) 142, one or more receive antennas (receivers) 144, and computer-readable media 146. The processors 140 may be configured to execute instructions, which may be stored in the computer-readable media 146 or in other computer-readable media accessible to the processors 140. In some embodiments, the processors 140 is a central processing unit (CPU), a graphics processing unit (GPU), or both CPU and GPU, or any other sort of processing unit. The one or more transmit antennas 142 may transmit signals to the base station 102, and the one or more receive antennas 144 may receive signals from the base station 102. In an embodiment, the antennas 142 and 144 may be included in a transceiver module of the UE 104.

The computer-readable media 146 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14.

The computer-readable media 146 may store several modules, such as instructions, data stores, and so forth that are configured to execute on the processors 140. For instance, the computer-readable media 140 may store a configuration module 148. Although not illustrated in FIG. 1, the computer-readable media 146 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 102, other UEs, etc.).

Although not illustrated in FIG. 1, the UEs 104 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (UE 104_1) in detail, each of the UEs 104_2, . . . , 104_N may have a structure that is at least in part similar to that of the UE 104_1. For example, similar to the UE 104_1, each of the UEs 104_2, . . . , 104_N may comprise processors, one or more transmit antennas, one or more receive antennas, and computer-readable media including a configuration module.

In an embodiment, the network settings module 130 stored in the computer-readable media 126 maintains a plurality of network settings associated with the network 100. Individual network settings maintained by the network settings module 130 may be pertinent to a single UE of the UEs 104_1, . . . , 104_N, a subset of the UEs 104_1, . . . , 104_N, or each of the UEs 104_1, . . . , 104_N. For example, a network setting of the plurality of network settings may specify a maximum bit rate at which a UE (or each of the UEs 104_1, . . . , 104_N) may transmit data to the BS 102. Another network setting of the plurality of network settings may specify a transmit time interval (tti) used by each of the UEs 104_1, . . . , 104_N to transmit data to the BS 102. Yet another network setting of the plurality of network settings may specify a maximum power that each of the UEs 104_1, . . . , 104_N may use to transmit data to the BS 102. The plurality of network settings maintained by the network settings module 130 may also include any other appropriate type of network settings.

In an embodiment, one or more of the plurality of network settings maintained by the network settings module 13 may be communicated to the UEs 104_1, . . . , 104_N (e.g., by the transmit antennas 122 to the receive antennas 144 of the UEs 104_1, . . . , 104_N). Based on receiving the network settings, the UEs 104_1, . . . , 104_N (e.g., the corresponding configuration modules 148) may configure themselves and communicate with the BS 012 accordingly.

Generally, the network 100 is made up of multiple macro cells 106. Thus, depending on the configuration and size, the network 100 can represent and serve various regional areas, e.g., a city, a state, an entire nation, the whole world, etc.

Figure 2:
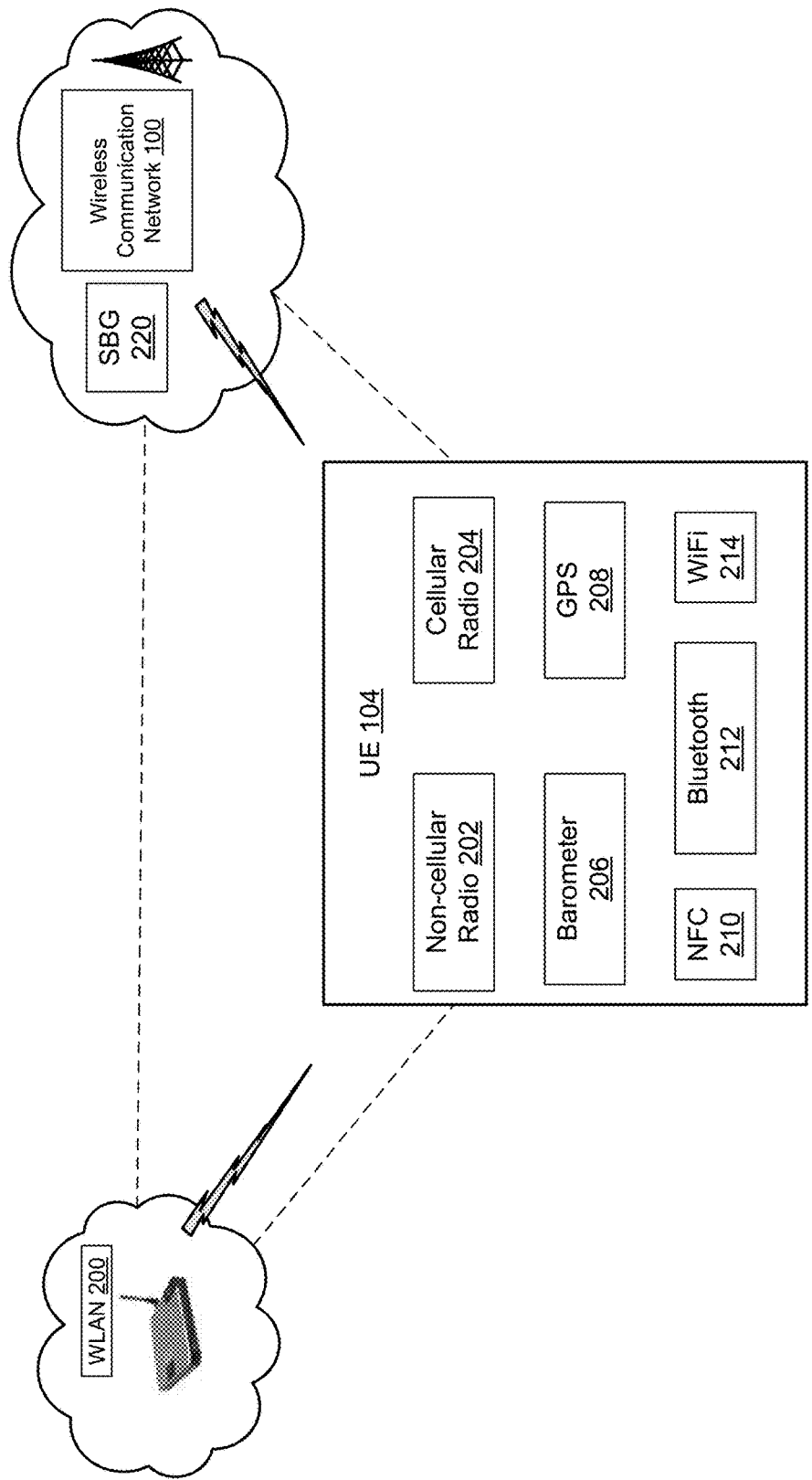
FIG. 2 schematically illustrates an example of an arrangement of a mobile device in communication with a wireless local access network (WLAN) and the wireless communication network of FIG. 1

FIG. 2 schematically illustrates an arrangement of a UE 104 that may operate within and connect to the wireless communication network 100 of FIG. 1 and may also operate within and connect to a wireless local access network (WLAN) 200. In embodiments, the WLAN may be located on an airplane. Generally, the UE 104 may connect to the WLAN 200 via a WiFi feature 214 of the UE 104. Generally, when operating the WiFi feature 214 of the UE 104, a non-cellular radio 202 is activated on the UE 104. In accordance with embodiments, a cellular radio 204 of the UE 104 allows for direct connection of the UE 104 to the wireless communication network 100 to make phone calls, access the Internet, etc. A non-cellular radio 202 generally does not allow for direct connection to the wireless communication network 100.

As is known, the UE 104 may access the wireless communication network 100 via the WLAN 200. Thus, the non-cellular radio 202 of the UE 104 allows for connection to the wireless communication network 100 but not directly. However, in order to place a phone call over the WLAN 200, and thereby the wireless communication network 100, a WiFi calling feature needs to be activated on the UE 104.

In accordance with embodiments, the UE 104 may include, among other features, a barometer 206 and a global positioning system (GPS) feature 208. The barometer 206 can allow for the UE 104 to determine the barometric pressure in its environment and thus, may allow for the UE 104 to determine its altitude. The GPS feature 208 may determine the location, including an altitude, for the UE 104. In accordance with embodiments, the UE 104 may also include a nearfield communication (NFC) feature 210 that allows for the UE 104 to communicate with other UEs 104 utilizing a NFC feature. The UE 104 may also include a Bluetooth feature 212 that allows for wireless connection of the UE 104 with various audio components such as, for example, headphones, earplugs, speakers, etc.

As may be seen in FIG. 2, the wireless communication network 100 includes a session border gateway (SBG) or session border controller (SBC) 220 (referred to herein as SBG 220). In embodiments, the wireless communication network 100 includes multiple SBGs 220. When messages are sent to and/or from UEs 104 accessing the wireless communication network 100 via the WLAN 200, a header within the messages identifies the WLAN and identifies the user, i.e. the subscriber, of the UE 104. The SBG 220 may apply header manipulation rules (HMRs) to extract this information. Upon determining which messages originated from or are being sent to the WLAN 200, the SBG 220 may determine a number of subscribers who are accessing the wireless communication network via the WLAN 200 to provide a unique subscriber count for subscribers of services from the wireless communication network 100 that are accessing the wireless communication network 100 via the WLAN 200, e.g., registered with the WLAN 200.

In embodiments, the HMRs may also analyze the message headers to allow the SBG 220 to determine which messages to and from the WLAN 200 are RCS messages and thus, provide a unique count of RCS sessions and RCS messages of UEs 104, and thereby subscribers, for the WLAN 200. The HMRs may also allow the SBG 220 to analyze the message headers to determine which messages of the WLAN 200 are short message service (SMS) messages, multimedia messaging service (MMS) messages and visual voice mail (VVM) messages and thus, are session initiation protocol (SIP) messages over Internet Protocol (IP) networks. Network or IP mapping of messages by the SBG 220 may be utilized to help measure MMS message traffic and VVM message traffic.

Figure 3:
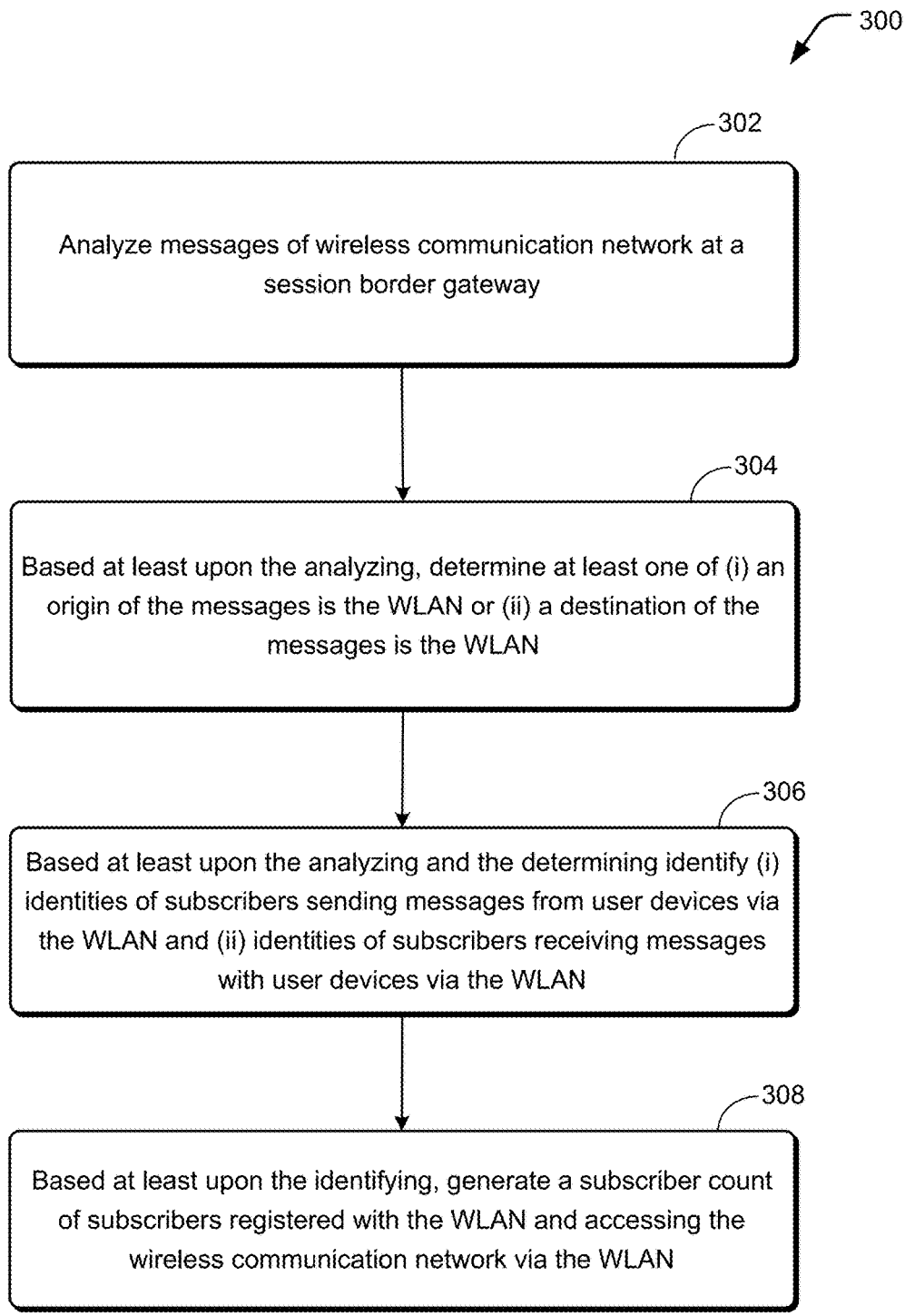
FIG. 3 is a flowchart illustrating a method of determining a number of subscribers to the wireless communication network of FIG. 1 that access the wireless communication network via the (WLAN), in accordance with various embodiments.

FIG. 3 is a flow diagram of an illustrative process that may be implemented within the wireless communication network 100. This process (as well as other processes described throughout) are illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processors and processing cores in other environments and computing devices.

FIG. 3 is a flowchart illustrating a method 200 of determining a number of subscribers of a wireless communication network, e.g., the wireless communication network 100, accessing the wireless communication network via a wireless local access network (WLAN), e.g., the WLAN 200. As illustrated, at block 302, one or more session border gateways (SBGs), e.g., SBGs 220, of the wireless communication network, analyze messages at the SBG. At block 304, based at least upon the analyzing, the one or more SBGs determine at least one of (i) an origin of the messages is the WLAN or (ii) a destination of the messages is the WLAN. At block 306, based at least upon the analyzing and the determining, the one or more SBGs identify (i) identities of subscribers sending messages from user devices via the WLAN and (ii) identities of subscribers receiving messages with user devices via the WLAN. At block 308, based at least upon the identifying, a subscriber count of subscribers registered with the WLAN and accessing the wireless communication network via the WLAN is generated.

The techniques described herein may be used for various types of networks besides WLANs. For example, the techniques described herein may be used for voice over LTE (VoLTE) networks, video over LTE (ViLTE) networks, etc.

Figure 4:
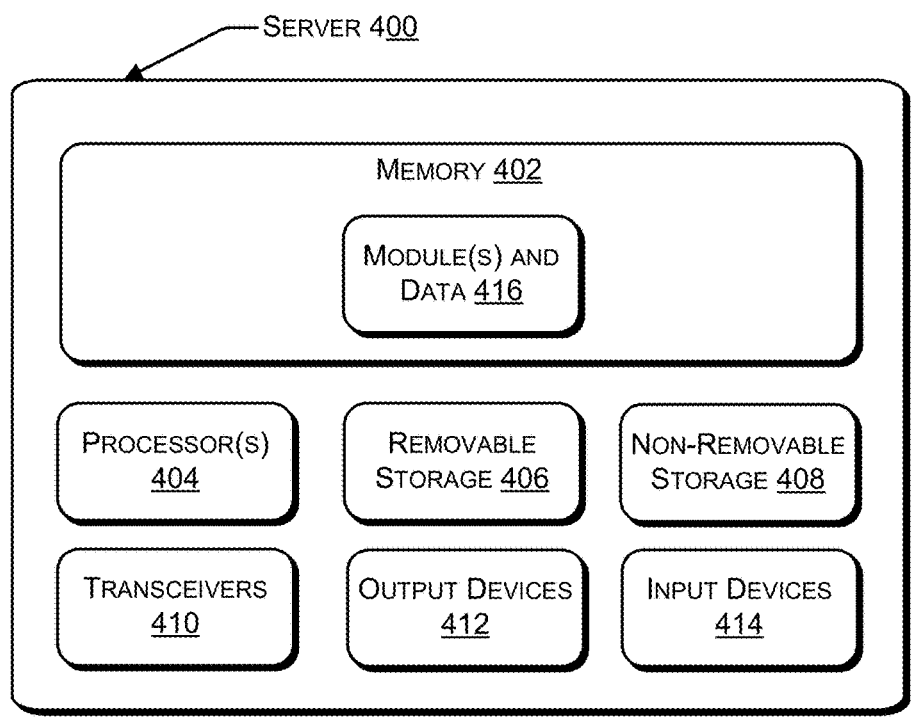
FIG. 4 illustrates a component level view of a server configured for use in the arrangement of FIG. 1 to provide various services of the wireless communication network of FIG. 1.

FIG. 4 illustrates a component level view of a server configured for use within a wireless communication network, e.g., wireless communication network 100 in order to provide various services within the wireless communication network, according to the techniques described herein. The server 400 may be located in the RNC or gateway 110. Additionally, the server 400 may be a separate entity located separately from the RNC 110. As illustrated, the server 400 comprises a system memory 402. Also, the server 400 includes processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.) or some combination of the two. In some implementations, the processor(s) 404 is a central processing unit (CPU), a graphics processing unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processors 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also or instead, the transceivers 410 may include wireless modem(s) to may facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method of determining a number of subscribers of a wireless communication network accessing the wireless communication network via a wireless local access network (WLAN), the method comprising:

analyzing, by one or more session border gateways (SBGs) of the wireless communication network, messages at the SBGs;

based at least upon the analyzing, determining, by the one or more SBGs, at least one of (i) an origin of the messages is the WLAN or (ii) a destination of the messages is the WLAN;

based at least upon the analyzing and the determining, identifying, by the one or more SBGs, (i) identities of subscribers sending messages from user devices via the WLAN and (ii) identities of subscribers receiving messages with user devices via the WLAN; and based at least upon the identifying, generating a subscriber count of subscribers registered with the WLAN and accessing the wireless communication network via the WLAN.

2. The method of claim 1, further comprising:
determining, by the one or more SBGs, a type of the messages originating at the WLAN or (ii) destined for the WLAN.

3. The method of claim 2, wherein the type of messages comprises one of a short message service (SMS), a multimedia messaging service (MMS), a visual voicemail (VVM) or a rich communication services (RCS).

4. The method of claim 3, further comprising:
based upon messages being RCS messages, determining a count of RCS sessions.

5. The method of claim 1, wherein analyzing, by the one or more SBGs of the wireless communication network, messages at the SBGs comprises analyzing the messages using header manipulation rules (HMRs).

6. An apparatus comprising:
a processor;
a transceiver coupled to the processor; and
programming instructions that, when executed by the processor, program the apparatus to perform operations including:
analyze messages received within or sent from a wireless communication network;
based at least upon the analyzing, determine at least one of (i) an origin of the messages is a wireless local access network (WLAN) or (ii) a destination of the messages is the WLAN;
based at least upon the analyzing and the determining, identify (i) identities of subscribers sending messages from user devices via the WLAN and (ii) identities of subscribers receiving messages with user devices via the WLAN, wherein the subscribers are subscribers of services provided by the wireless communication network; and
based at least upon the identifying, generate a subscriber count of subscribers registered with the WLAN and accessing the wireless communication network via the WLAN.

7. The apparatus of claim 6, wherein the programming instructions, when executed by the processor, further program the apparatus to perform operations including:
determine a type of the messages originating at the WLAN or (ii) destined for the WLAN.

8. The apparatus of claim 7, wherein the type of messages comprises one of a short message service (SMS), a multimedia messaging service (MMS), a visual voicemail (VVM) or a rich communication services (RCS).

9. The apparatus of claim 8, wherein the programming instructions, when executed by the processor, further program the apparatus to perform operations including:
based upon messages being RCS messages, determine a count of RCS sessions.

10. The apparatus of claim 6, wherein analyzing the messages comprises analyzing the messages using header manipulation rules (HMRs).

11. The apparatus of claim 6, wherein the apparatus is included within a session border controller (SBC).

12. The apparatus of claim 6, wherein the apparatus is included within a session border gateway (SBG).

13. The apparatus of claim 6, wherein the WLAN is located on an airplane.

14. A non-transitory storage medium having programming instructions stored thereon that, when executed by a computing device, cause the computing device to perform operations comprising:
analyze messages received within or sent from a wireless communication network;
based at least upon the analyzing, determine at least one of (i) an origin of the messages is a wireless local access network (WLAN) or (ii) a destination of the messages is the WLAN;
based at least upon the analyzing and the determining, identify (i) identities of subscribers sending messages from user devices via the WLAN and (ii) identities of subscribers receiving messages with user devices via the WLAN, wherein the subscribers are subscribers of services provided by the wireless communication network; and
based at least upon the identifying, generate a subscriber count of subscribers registered with the WLAN and accessing the wireless communication network via the WLAN.

15. The storage medium of claim 14, wherein the programming instructions, when executed by the computing device, further cause the computing device to perform operations comprising:
determine a type of the messages originating at the WLAN or (ii) destined for the WLAN.

16. The storage medium of claim 15, wherein the type of messages comprises one of a short message service (SMS), a multimedia messaging service (MMS), a visual voicemail (VVM) or a rich communication services (RCS).

17. The storage medium of claim 16, wherein the programming instructions, when executed by the computing device, further cause the computing device to perform operations comprising:
based upon messages being RCS messages, determine a count of RCS sessions.

18. The storage medium of claim 14, wherein analyzing the messages comprises analyzing the messages using header manipulation rules (HMRs).

19. The storage medium of claim 14, wherein the storage medium is included within a session border controller (SBC).

20. The storage medium of claim 14, wherein the storage medium is included within a session border gateway (SBG).

* * * * *